Oct. 18, 1955 S. H. LIGHT 2,720,912
ARM RESTS FOR THE SEATS OF MOTOR ROAD VEHICLES
Filed Jan. 5, 1953
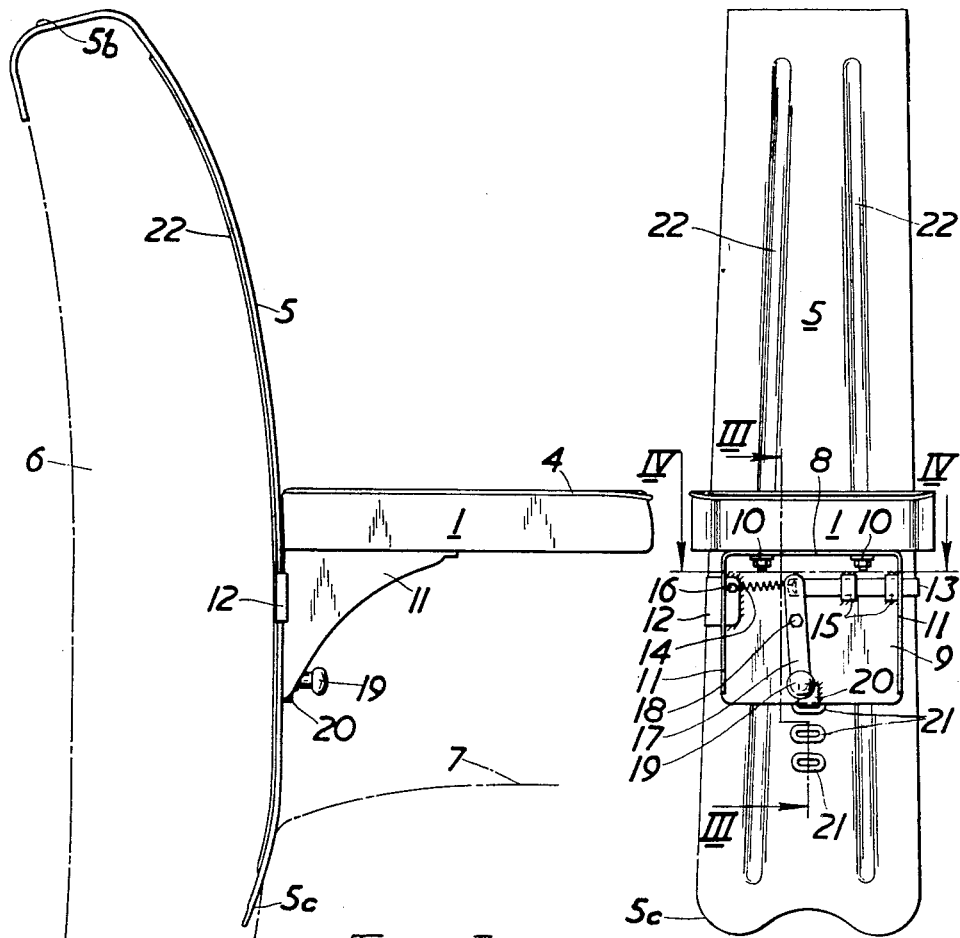
Fig. 1.
Fig. 2.
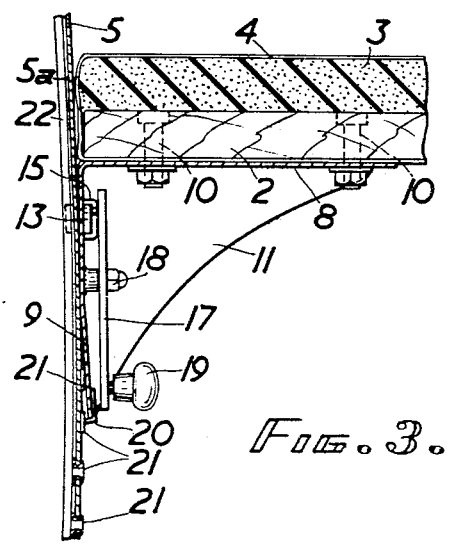
Fig. 3.
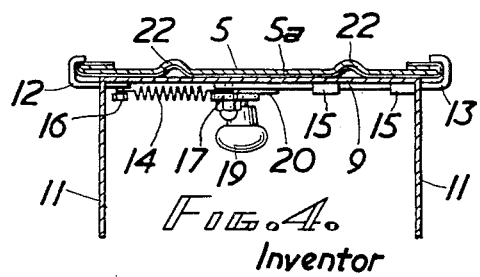
Fig. 4.
Inventor
Sydney H. Light
By Emery, Holcombe & Blair
Attorney

United States Patent Office 2,720,912
Patented Oct. 18, 1955

2,720,912

ARM RESTS FOR THE SEATS OF MOTOR ROAD VEHICLES

Sydney Herbert Light, London, England

Application January 5, 1953, Serial No. 329,678

Claims priority, application Great Britain January 11, 1952

4 Claims. (Cl. 155—112)

This invention relates to arm rests for the seats of motor road vehicles. The object of the invention is the provision of an improved arm rest and securing means therefor which may be sold as a separate component and secured to the back of a seat of the bench type which does not have an arm rest permanently fitted.

The invention consists broadly of a detachable arm rest for mounting on the seat of a vehicle, wherein a strip of sheet metal is provided having a hooked upper end adapted to be hooked over the top of the back rest of the seat with the main portion of said strip extending downwards flush against the front face of said back rest, and the arm rest proper has its rear end secured (or adapted to be secured) to said strip.

In order that the invention may be the more clearly understood an arm rest in accordance therewith will now be described reference being made to the accompanying drawings wherein:

Figure 1 is a side elevation of the arm rest shown in position on a bench type seat.

Figure 2 is a front elevation of the same.

Figure 3 is a section on line III—III of Figure 2.

Figure 4 is a section on line IV—IV of Figure 2.

Referring to the drawings the arm rest proper 1 consists of a strong elongated base portion 2 of, say, wood, with padding material 3, of about the same thickness as itself, mounted on its upper surface, the whole being covered by a cover 4 of, say, leather or equivalent material. Said arm rest 1 is adapted to be rigidly secured at its rear end to the front face of an elongated plate or strip 5 of sheet steel, say three inches wide, which has a leather or like covering 5a on its front face, and which is adapted to be secured flush against the front face of the back rest 6 of the bench-type seat, with said arm rest 1 projecting forwards in the appropriate manner.

Thus, it will be seen that said plate or strip 5 is shaped so that it may be disposed vertically against the front face of said back rest 6 with its main portion lying flush against said front face and its upper portion 5b hooking with a close fit over the top of said back rest so as to extend a little way down the back of said back rest. The lower portion 5c of said plate or strip 5 extends down a little way into the fissure between the front face of said back rest 6 and the rear surface of the seat portion 7 of the seat. Thus said plate or strip 5 is secured firmly to said back rest 6 in respect of forces in all directions except upwards, and especially against downward force exerted on the arm rest 1. By an upward force said plate or strip can easily be lifted from said back rest 6.

For securing said arm rest 1 to said plate 3, a bracket is employed which comprises two plate portions 8 and 9, the former of which is horizontal and is permanently and rigidly secured by bolts 10 flush against the underside of the base portion 2 of the arm rest, and the latter of which is vertical and is detachably and adjustably secured flush against the front surface of the plate or strip 5. Said bracket also comprises side web portions 11 which give it the necessary rigidity.

For securing said vertical plate portion 9 against the front surface of the plate or strip 5, said plate portion 9 has, extending horizontally beyond one side edge thereof and rigidly secured thereto, a hook member 12 which hooks round the corresponding side edge of the plate or strip 5 as best shown in Figure 4. A second hook member 13 is provided which extends horizontally beyond the other side edge of said plate member 9 and hooks round the other side edge of said plate or strip 5, but this hook member 13 is not rigidly mounted on said vertical plate portion 9, but is mounted on said plate portion so as to be horizontally slidable relative thereto under the influence of or in opposition to, a tension spring 14. Said spring 14 biases said hook member 13 in the direction towards the hook member 12 so that said two hook members are held at the hooking position with respect to the side edges of the plate or strip 5, and thus the plate portion 9 is secured against the surface of said plate or strip 5. By moving said hook member 13 in opposition to said spring 14 said plate portion 9, and therefore the whole bracket 8, 9, 11 and arm rest 1 can be removed from the plate or strip 5. Said hook portions 12, 13 are at a level near the upper end of said vertical plate portion 9.

More particularly, said hook member 13 has an extension which slides horizontally over the face of the vertical plate portion 9, being guided in staple-like guides 15 mounted on said plate portion. The extremity of said extension is connected to one end of the spring 14 and the other end of said spring is secured to said vertical plate portion 9 by means of a screw 16. For moving said hook member 13 in opposition to said spring 14 a lever 17 is provided pivotally mounted between its ends at 18 on the face of the vertical plate portion 9, and secured at one end by means of a pin and slot connection to the extension of said hook member 14, and having a finger knob 19 mounted on its other end.

For restraining said vertical plate portion 9 positively against vertical or horizontal movement in its own plane relative to the plate or strip 5, said plate portion 9 has a catch 20 rigidly secured to its lower edge and having a bent over portion which is adapted to engage in a selected one of a plurality of eyeleted holes 21 formed at different levels through said strip or plate 5. For changing the level of the bracket 8, 9, 11, and therefore of the arm rest 1, the hook member 13 is actuated to the release position, and said bracket is removed from the plate or strip 5 and then replaced with the catch 20 in engagement with the required hole 21, whereupon the hook members 12 and 13 are re-engaged with the edges of said plate or strip. The bracket 8, 9, 11, and therefore the arm rest 1, is now rigidly secured to the plate or strip 5. It will be noted that as the hook members 12, 13 are near the upper end of the vertical plate portion 9, the abutment of said vertical plate portion against the plate or strip 5 will prevent any tilting of the bracket 8, 9, 11. It will be observed from Figure 3 that the lower part of said vertical plate portion 9 is bowed with its centre a little away from the plate or strip 5. This is for accommodating the eyelets of the holes 21.

The reference 22 designates ribs pressed out of the plate or strip 5 to give it added rigidity.

I claim:

1. A detachable arm rest for mounting on the seat of a vehicle, comprising a strip of sheet metal adapted to be mounted on the back rest of said seat, with a portion of said strip against the front face of said back rest and extending in a direction up and down said back rest, an elongated arm rest proper, a plate mounted on said arm rest proper so as to extend downwards from one end thereof, two hooks mounted on said plate at a level considerably above the lower edge of said plate and adapted to hook round the side edges of said strip to hold said plate flush against the face of said strip with said arm rest extending outwards from said strip, at least one of said hooks being movable relative to said plate in the plane of said plate to release said hooks from said strip, a series of holes in said strip in a row longitudinally thereof, and a rearward projection fixed rigid on said plate and adapted to engage in any selected one of said holes when said plate is held against the face of said strip.

2. A detachbale arm rest for mounting on the seat of a vehicle, comprising a strip of sheet metal adapted to be mounted on the back rest of said seat, with a portion of said strip against the front face of said back rest and extending in a direction up and down said back rest, an elongated arm rest proper, a plate mounted on said arm rest proper so as to extend downwards from one end thereof, two hooks mounted on said plate at a level considerably above the lower edge of said plate and adapted to hook round the side edges of said strip to hold said plate flush against the face of said strip with said arm rest extending outwards from said strip, one of said hooks being rigidly attached to said plate and the other hook being horizontally slidable relative to said plate, in the plane of said plate, to and from a position at which both hooks hook round said side edges of said strip and a position at which said hooks are released from said strip spring means biasing said other hook to its first-named position, a series of holes in said strip in a row longitudinally thereof, and a rearward projection fixed rigid on said plate and adapted to engage in any selected one of said holes when said plate is held against the face of said strip.

3. A detachable arm rest for mounting on the seat of a vehicle, comprising a strip of sheet metal adapted to be mounted on the back rest of said seat, with a portion of said strip against the front face of said back rest and extending in a direction up and down said back rest, an elongated arm rest proper, a plate mounted on said arm rest proper so as to extend downwards from one end thereof, two hooks mounted on said plate at a level considerably above the lower edge of said plate and adapted to hook round the side edges of said strip to hold said plate flush against the face of said strip with said arm rest extending outwards from side strip, one of said hooks being rigidly attached to said plate and the other hook being horizontally slidable relative to said plate, in the plane of said plate, to and from a position at which both hooks hook round said side edges of said strip and a position at which said hooks are released from said strip, spring means biasing said other hook to its first-named position, a hand lever pivotally mounted between its ends on said plate and having one end connected to said other hook whereby, by actuating the other end of said hand lever, said other hook can be operated to its second-named position, a series of holes in said strip in a row longitudinally thereof, and a rearward projection fixed rigid on said plate adjacent the lower edge thereof and adapted to engage in any selected one of said holes when said plate is held against the face of said strip.

4. A detachable arm rest for mounting on the seat of a vehicle, comprising a strip of sheet metal adapted to be mounted on the back rest of said seat, with a portion of said strip against the front face of said back rest and extending in a direction up and down said back rest, an elongated arm rest unit, two hooks mounted on said arm rest unit at one end thereof adapted to hook round the side edges of said strip to hold the said end of said arm rest unit against the face of said strip with said arm rest unit extending outwards from said strip, at least one of said hooks being movable relative to said arm rest unit to release said hooks from said strip, a series of holes in said strip in a row longitudinally thereof, and a rearward projection on said arm rest unit adapted to engage in any selected one of said holes when the said end of said arm rest unit is held against the face of said strip by said hooks.

References Cited in the file of this patent

UNITED STATES PATENTS

| | | |
|---|---|---|
| 1,463,293 | Paddock | July 31, 1923 |
| 2,530,384 | Faggen | Nov. 21, 1950 |
| 2,560,791 | Fincher et al. | July 17, 1951 |
| 2,569,834 | Smith | Oct. 2, 1951 |
| 2,584,732 | Okim | Feb. 5, 1952 |
| 2,658,559 | Beebe | Nov. 10, 1953 |